United States Patent
Ohyama

[19]

[11] Patent Number: 6,147,959
[45] Date of Patent: Nov. 14, 2000

[54] METHOD AND APPARATUS FOR RECORDING/REPRODUCING INFORMATION UTILIZING NEAR FIELD LIGHT

[75] Inventor: Junji Ohyama, Yokohama, Japan

[73] Assignee: Canon Kabushiki Kaisha, Tokyo, Japan

[21] Appl. No.: 09/059,340

[22] Filed: Apr. 14, 1998

[30] Foreign Application Priority Data

Apr. 14, 1997 [JP] Japan ................................ 9-113537

[51] Int. Cl.$^7$ ........................................................... G11B 7/00
[52] U.S. Cl. ................................................................ 369/126
[58] Field of Search .................................... 369/126, 100, 369/101; 250/306

[56] References Cited

U.S. PATENT DOCUMENTS

| | | | |
|---|---|---|---|
| 4,785,437 | 11/1988 | Dransfeld | 369/126 |
| 5,128,893 | 7/1992 | Takanashi et al. | 369/126 |
| 5,546,374 | 8/1996 | Kuroda et al. | 369/126 |
| 5,623,295 | 4/1997 | Kishi et al. | 369/126 |
| 5,777,977 | 7/1998 | Fujiwara et al. | 369/126 |
| 5,793,743 | 8/1998 | Duerig et al. | 369/126 |
| 5,949,600 | 9/1999 | Akiyama et al. | 369/126 |
| 6,001,519 | 7/1998 | Yang et al. | 369/126 |

FOREIGN PATENT DOCUMENTS

| | | | |
|---|---|---|---|
| 3-277903 | 12/1991 | Japan . | |
| 5-250735 | 9/1993 | Japan | 369/126 |

OTHER PUBLICATIONS

E. Betzig, et al., "Near–Field Magneto–Optics and High Density Data Storage", Appl. Phys. Lett., vol. 61, No. 2, Jul. 13, 1992, pp. 142–144.

E. Cohen, et al., "Fluorescence Line Narrowing, Localized Exciton . . . $CdS_xSe_{1-x}$", Physical Review B, vol. 25, No. 6, Mar. 1982, pp. 3828–2840.

Y. Nishikata, et al., "Preparation of a Conducting . . . a Langmuir–Blodgett Technique", J. Chem. Soc., Chem. Commun., (1988) pp. 1040–1042.

D. Braun, et al., "Visible Light Emission from Semiconducting Polymer Diodes", Appl. Phys. Lett., vol. 58, No. 18, May 6, 1991, pp. 1982–1984.

T. Vahlenkamp, et al., "Poly (2,5–dialkoxy–p–phenylene)s–synthesis and Properties", Macromol. Chem. Phys., vol. 195, (1994), pp. 1933–1952.

T. Pangaribaun, et al., "Highly Controllable Fabrication of Fiber Probe . . . Microscope", Scanning, vol. 16, (1994), pp. 362–367.

G. Binning, et al., "Surface Studies by Scanning Tunneling Microscope", Physical Review Letters, vol. 49, No. 1, Jul. 5, 1982, pp. 57–61.

G. Binning, et al., "Atomic Force Microscope", Physical Review Letters, vol. 56, No. 9, Mar. 3, 1986, pp. 930–933.

M. Era, et al., "Preparation of Highly Oriented Poly(p–phenylenevinylene) . . . Technique", Chemistry Letters, No. 7, (1988), pp. 1097–1100.

Y. Kim, et al., "Enhanced Quantum Efficiency in . . . Langmuir–Blodgett Films", Appl. Phys. Lett., vol. 69, No. 5, Jul. 29, 1996, pp. 599–601.

*Primary Examiner*—Nabil Hindi
*Attorney, Agent, or Firm*—Fitzpatrick, Cella, Harper & Scinto

[57] ABSTRACT

A probe having an electroconductive section is brought close to a recording medium having a recording layer on an electrode. The recording layer is composed of an organic compound capable of emitting light as a voltage is applied thereto. While the recording medium is scanned by the probe, a recording voltage is applied to the recording layer via the probe to a level adapted to produce changes in the light emitting performance of the recording layer to thereby record information. The changes in the light emitting performance is detected optically to thereby reproduce the recorded information.

12 Claims, 4 Drawing Sheets

METHOD AND APPARATUS FOR RECORDING/REPRODUCING INFORMATION UTILIZING NEAR FIELD LIGHT

BACKGROUND OF THE INVENTION

1. Field of the Invention

This invention relates to a method for recording/reproducing information utilizing near-field light and also to an information recording/reproducing apparatus that uses such a method.

2. Related Background Art

In recent years, information recording materials find applications at the very heart of the electronic industry that manufactures computers, computer-related apparatus, video discs, digital audio discs and other devices. In particular, various products using light for recording/reproducing information, such as magneto-optic discs, are enjoying an ever-increasing popularity.

Currently and in the foreseeable future, memory devices are required (1) to be able to store large volume of information with a high storage density, (2) to have a short response time for recording/reproducing information, (3) to be manufactured at low cost with a high productivity and (4) to consume power only at a reduced rate.

To improve the currently available optical-memory technologies and satisfy the above identified requirements, there has to be provided a technology that is adapted to downsizing optical devices in the first place. Because of the fundamental property of diffraction on the part of light, optical devices show a dimensional lower limit that is defined by the wavelength of light to be used for the device. Additionally, any gauging system using optical devices cannot achieve a resolution exceeding the wavelength of light passing therethrough because it also utilizes the diffraction of light.

Under these circumstances, efforts have been paid recently to realize a gauging system and/or a fine machining system capable of dealing with dimensions as small as nanometers by utilizing fields (so-called evanescent fields) adapted to exploit electromagnetic interactions within a space dimensionally smaller than the wavelength of light passing therethrough. From the viewpoint of memory technologies, this technique is promising for high density recording/reproduction of information because it is adapted to store data within an area comparable to or smaller than the size of a molecule (or several nanometers) by utilizing and controlling the distribution of evanescent fields.

More specifically, scanning near-field optical microscopes (SNOMs) have been developed to observe the surface of an specimen by utilizing evanescent light seeping out from the surface of the specimen or the microaperture arranged at the tip of the minute probe of the microscope. Reports have been made, for example, on experiments of observing the emission of fluorescent light or changes in the optical transmissivity of a fluorescent material or a photochromic material in a minute local area comparable to a recording bit by utilizing such a microscope [E. Cohen et al., Phys. Rev. B25, 3828, (1982)].

Figure 1A:
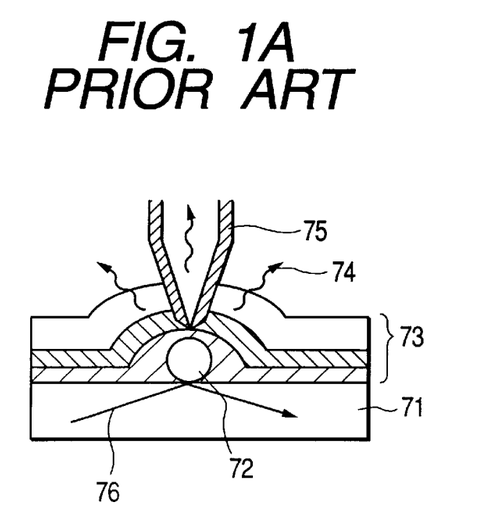
Figure 1B:
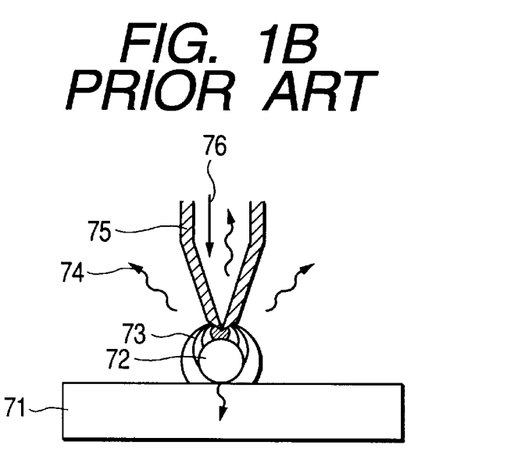

FIGS. 1A and 1B of the accompanying drawings schematically illustrate the principle of a scanning near-field optical microscope. The mode of operation of the microscope as shown in FIG. 1A is referred to as C mode.

With a method of using a scanning near-field optical microscope, evanescent light (field) 73 seeping out to the surface of transparent substrate 71 when total reflection light is made to strike the specimen 72 on the substrate 71 from below is scattered by the specimen 72 to produce scattered light 74, which is measured by means of a probe 75 having a fine aperture at the front end thereof (transparent and coated with a metal thin film around the microaperture).

The mode of operation of the microscope in FIG. 1B is referred to I mode. In this mode of operation, scattered light 74 that is scattered by the specimen 72 when the specimen 72 is irradiated with evanescent light 73 seeping out from the probe 75 is detected by the same probe 75.

When an ordinary fluorescent light emitting pigment is used as the material of a recording medium, the recorded information can be lost as the pigment is discolored. When a photochromic material is used, there arises a problem of a low response speed and that of the lack of heat stability in isomerization.

There is a report of recording information on a Co/Pt recording medium [E. Betzig et al., Appl. Phys. Lett., 61, 142 (1992)]. However, the recording bit size of the recording medium of this report is as large as 100 nm, which is too large for high density recording.

The specimen or the recording medium has to be irradiated from below when the C mode detecting operation is used for reproducing information so that a transparent substrate has to be used to carry a specimen or a recording medium thereon.

SUMMARY OF THE INVENTION

In view of the above identified problems, it is therefore an object of the present invention to provide a method for recording/reproducing information that is free from the problem of lost information due to a discolored pigment and can achieve a high recording density by using a simply configured apparatus. Another object of the present invention is to provide an information recording/reproducing apparatus that uses such a method.

According to an aspect of the invention, the above first object is achieved by providing a method for recording/reproducing information comprising steps of:

arranging a probe having an electroconductive section and a recording medium having a recording layer of an organic compound on an electrode, the layer being capable of emitting light as a voltage is applied thereto, close by relative to each other and causing them to scan each other;

applying a voltage between the probe and the recording layer to a level adapted to produce changes in the light emitting performance of the recording layer to thereby record information; and optically detecting the changes in the light emitting performance to thereby reproduce the information.

According to another aspect of the invention, the above second object is achieved by providing an apparatus for recording/reproducing information comprising:

a scanning mechanism for arranging a probe having an electroconductive section and a recording medium having a recording layer of an organic compound on an electrode, the layer being capable of emitting light as a voltage is applied thereto, close by relative to each other and causing them to scan each other;

a voltage application means for applying a voltage between the probe and the recording layer to a level adapted to produce changes in the light emitting performance of the recording layer to thereby record information; and an optical detection means for optically detecting the changes in the light emitting performance to thereby reproduce the information.

BRIEF DESCRIPTION OF THE DRAWINGS

FIGS. 1A and 1B are schematic illustrations showing the principle of a scanning near-field optical microscope. FIG. 1A is a view for the C mode of operation and FIG. 1B is a view for the I mode of operation.

DESCRIPTION OF THE PREFERRED EMBODIMENTS

Now, the present invention will be described in greater detail by referring to the accompanying drawings that illustrate preferred embodiments of the invention.

Figure 2:
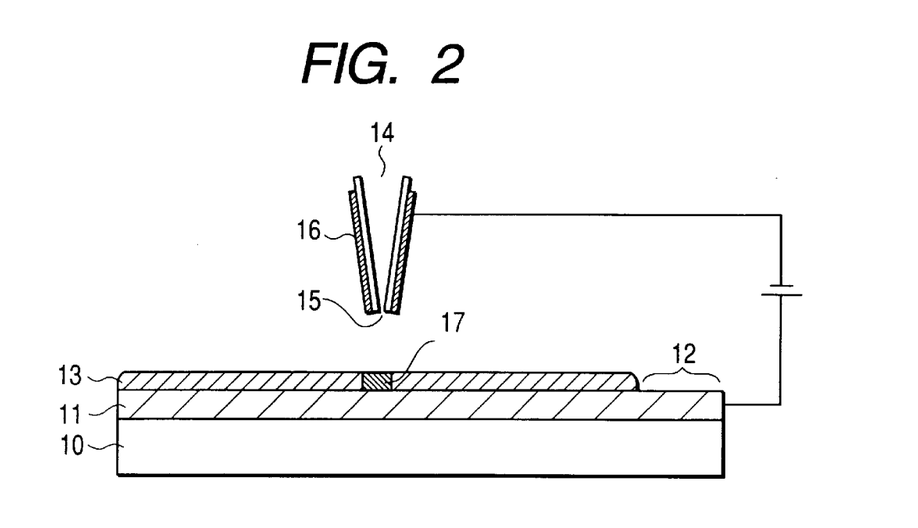
FIG. 2 is a schematic cross-sectional side view of a combination of a probe and a recording medium that can be used for the purpose of the invention.

FIG. 2 is a schematic cross-sectional side view of a combination of a probe and a recording medium that can be used for the purpose of the invention.

In FIG. 2, reference numeral 10 denotes an insulating substrate typically made of glass or quartz or made from an undoped silicon wafer. Reference numeral 11 denotes an electrode for carrying a recording medium directly thereon. It may be made of any appropriate material whose surface is made electroconductive and smooth. Materials that can be used for the electrode include metals such as gold, platinum, silver, copper, palladium, aluminum, indium, tungsten, tin, lead, alloys of any of them, graphite, suicides, electroconductive oxides such as ITO and n- or p-doped silicon. The electrode 11 includes a drawn-out section 12 made of an electroconductive material that is the same as the electrode 11 itself so that a voltage may be applied to the recording medium 13 in a manner as will be described hereinafter. The electrode 11 and the drawn-out section 12 may be prepared by means of an appropriate technique, such as vacuum evaporation, sputtering or printing.

If necessary, the surface of the electrode 11 is made evenly hydrophobic or hydrophilic by using an appropriate means optimally adapted to the material of the electrode 11, although no specific means is mentioned herein. If the surface of the electrode 11, for example made of a noble metal or a metal oxide, is to be made hydrophobic, it is cleansed by an appropriate means adapted to the material of the electrode 11 and a layer of an amphiphilic substance, such as a fatty acid or a derivative thereof, is laid thereon by means of the Langmuir-Blodgett (hereinafter referred to as LB) method. If the electrode 11 is made of gold, for example, it may be made to react with a hydrocarbon compound having a thiol group or an amino group at an end to produce a layer. If silicon is used as the electrode material, on the other hand, the surface of the electrode is cleansed by an appropriate means and then treated with a solution containing an amphilphilic substance by means of the LB method or hydrofluoric acid or a salt thereof, or alternatively, with a silane coupling reagent. If the surface of the electrode 11 is to be made hydrophilic, it may be subjected to ozone ashing or is immersed into a chromic acid mixture.

Then, an organic compound, capable of emitting light as a voltage applied thereto is spread on the electrode 11 to produce a recording layer 13. While any organic compound capable of emitting light when a voltage is applied thereto may be used for the recording layer 13, a preferable choice is the use of a polymer that would not fissure at the ends of the electrodes or give rise to pin holes when it is formed into a thin film. Materials that can advantageously be used for the purpose of the invention include poly(p-phenylene-vinylene) [J. Chem. Soc., Chem. Commun., 1040, 1988] and other solvent-soluble polymers [Appl. Phys. Lett., 58, 1982 (1991), Macromol. Chem. Phys., 195, 1933 (1994)].

A solution or a mixture of the materials above is spread on the electrode 11 by means of an appropriate technique selected from printing, spin coating, casting, dipping, bar coating, roll coating, the LB method and the like. The LB method has advantages of providing a highly uniform built-up film, whose thickness can be controlled on the order of a molecule, and a high and evenly distributed material density per unit area, and also of allowing the formation of a built-up film under moderate conditions, and the use of a known apparatus without requiring any significant modification.

The film thickness of the recording medium 13 is preferably between 1 nm and 1 $\mu$m, and more preferably between 1 and 500 nm.

The drawn-out section 12 and other sections that do not require the thin film may be cleaned with a solvent in advance.

Figure 3:
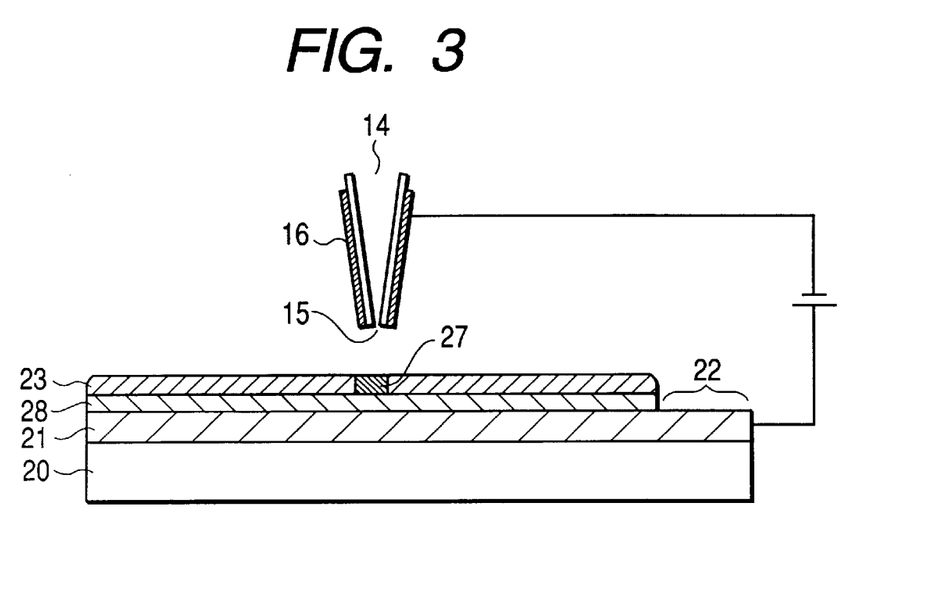
FIG. 3 is a schematic cross-sectional side view of another combination of a probe and a recording medium that can be used for the purpose of the invention.
Figure 4:
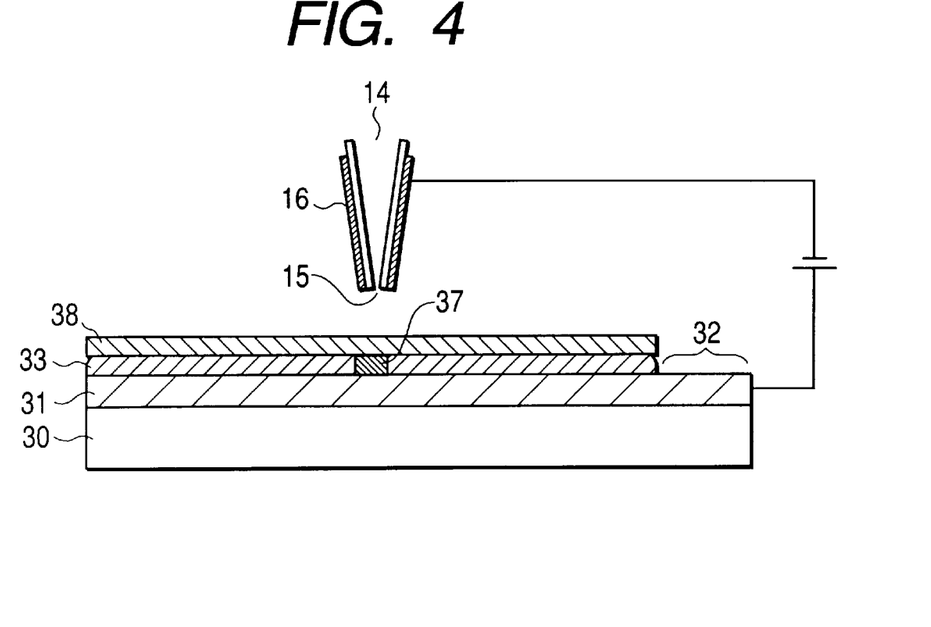
FIG. 4 is a schematic cross sectional side view of a still another combination of a probe and a recording medium that can be used for the purpose of the invention.
Figure 5:
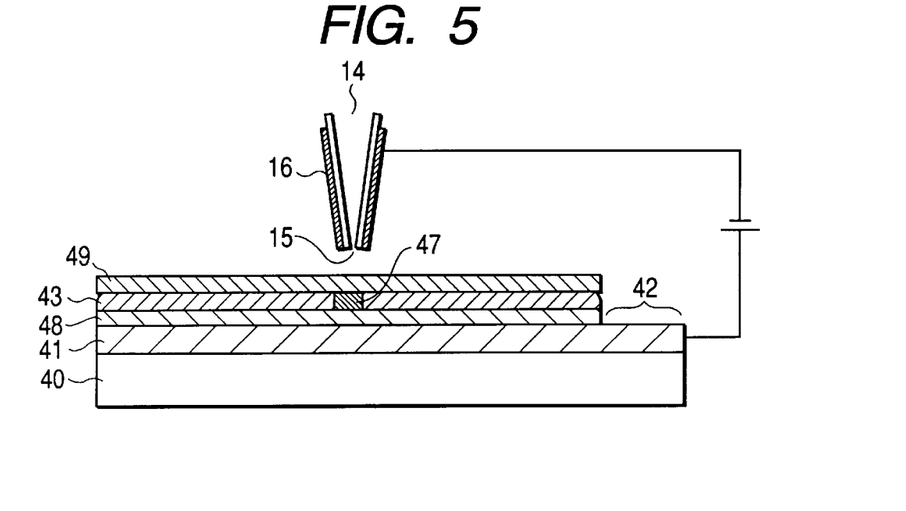
FIG. 5 is a schematic cross-sectional side view of a further combination of a probe and a recording medium that can be used for the purpose of the invention.

FIGS. 3 through 5 are schematic cross-sectional side views of other combinations of a probe and a recording medium, illustrating different embodiments of information recording/reproducing method according-,to the invention. Referring to FIG. 3, a hole-transport layer 28 containing a hole transport material may be provided between the recording layer 23 and the electrode 21.

Alternatively, as shown in FIG. 4, an electron transport layer 38 containing an electron transport material may be provided between the recording layer 33 and the probe 34, which will be described hereinafter.

Still alternatively, as shown in FIG. 5, a hole-transport layer 48 containing a hole transport material may be provided between the recording layer 43 and the electrode 41 and, at the same time, an electron-transport layer 49 containing an electron-transport material may be arranged between the recording medium 43 and a probe 44, which will be described hereinafter.

Any known appropriate materials can be used for the electron-transport layer and the hole-transport layer. Materials that can be used for the hole-transport layer include pyrazoline derivatives, arylamine derivatives, stilbene derivatives and triphenyldiamine derivatives. Materials that can be used for the electron-transport layer include metal complexes of oxadiazole derivatives, anthraquinodimethane and its derivatives, benzoquinone and its derivatives, naphthoquinone and its derivatives, anthraquinone and its derivatives, tetracyanoanthraquinodimethane and its derivatives, fluorenone derivatives, diphenyldicyanoethylene and its derivatives, diphenoquinone derivatives and 8-hydroxyquinoline and its derivatives. Any single one of these materials may be selected or, alternatively, a mixture of two or more than two of the materials may be used. A solution or a mixture of the materials of the hole-transport layer 18 and that of the material of the electron-transport layer 19 may be spread by means of an appropriate technique selected from printing, spin coating, casting, dipping, bar coating, roll coating, the LB method and the like to produce the layers.

A probe 14 having a microaperture 15 is an optically transparent probe that can be prepared by means of a method described in T. Pangaribaum et al., Scanning, 16, 362 (1994). The probe 14 is coated with an electroconductive material 16 by means of evaporation or sputtering.

The electroconductive material 16 preferably has a work function different from that of the electrode 11. If, for example, a material having a large work function such as ITO, Pt or Au is used for the electrode 11, the electroconductive material 16 is preferably selected from materials having a small work function such as Al, Mg, Ag and a mixture of any of them. A clear light emitting response can be obtained by using such a combination when a voltage is applied to the recording layer 13 in a manner as will be discussed hereinafter.

Then, the probe 14 having a microaperture 15 as described above is brought close to the recording layer 13. When they are brought close to each other, a positional resolution on the order of nanometer can be obtained by using the principle of a scanning-tunneling microscope (STM) adapted to observe the surface structure of a real space by causing a metal probe and an electroconductive specimen to scan each other, while monitoring the tunneling current flowing between them [G. Binnig et al., Phys. Rev. Lett., 49, 57 (1982)], that of an atomic force microscope (AFM) adapted to observe the surface of a specimen by detecting the atomic force between a specimen and a probe [G. Binnig et al., Phys. Rev. Lett., 56, 930 (1986)] or that of a composite unit comprising both of them (AFM/STM) (Japanese Patent Application Laid-Open No. 3-277903).

Subsequently, a pulse voltage is applied to an appropriately selected spot in the recording layer 13 by way of the electroconductive coat 16 of the probe 14. The applied voltage has to exceed at least the level required for the recording layer 13 to emit light and get to a level that can significantly change the light-emitting performance of the recording layer 13. If, for example, the recording layer 13 emits light when a DC voltage of 5V is applied thereto, a pulse voltage having a wave height of about 10V may be applied to the recording layer 13 from the probe 14. Note that the recording layer 13 is on the positive side when the voltage is applied thereto. If, to the contrary, a pulse voltage is applied from the probe 14 to bring the recording layer 13 on the negative side, the wave height of the pulse voltage may be comparable to the level that makes the recording layer 13 emit light or a half thereof.

With the above operation, the recording layer 13 changes its light-emitting responsivity at the spot where the voltage is applied and the front end of the probe is directed within a circular area having a diameter not greater than 10 nm so that consequently, a piece of information is recorded there (see the recording section 17 in FIG. 2). Subsequently, the probe 14 is driven to scan the surface of the specimen both in the X- and Y-directions to apply a voltage to the latter.

After applying voltages in an appropriate region, the region is rescanned with applying a DC voltage between the recording layer 13 and the probe 14 at a level that causes the recording layer to emit light. Then, the recording layer emits light due to the applied DC voltage to show a light-emitting performance that is differentiated from that of the surrounding areas where the pulse voltage was not applied so that the piece of information that has been recorded can be read by detecting the change in the light-emitting performance as a change in the evanescent field appearing near the microaperture 15 of the probe 14, utilizing the above difference. Thus, the recorded information can be reproduced with an optimal S/N ratio if the area of the recorded information does not emit light.

Now, a recording/reproducing apparatus adapted to use a recording medium prepared in the above described manner will be described by referring to the block diagram of FIG. 6.

The probe 54 is coated with an electroconductive coat 56 at the front end thereof. An original point is selected for the probe 54 by means of probe-displacement detection means 57. Then, an estimated displacement of the probe 54 from the original point is determined by using the known spring constant of the cantilever that holds the probe 54 in order to select an effective range for the atomic force to be observed. Note that the displacement corresponds to the atomic force acting between the probe 54 and the recording medium 53.

Then, as the recording medium 53 and the probe 54 are brought closer to each other to start an observation cycle, an atomic force appears between the front end of the probe 54 where the microaperture 55 is arranged and the surface of the recording medium 53 and causes the entire probe 54 to deflect.

Thus, the output signal from the probe-displacement detection means 57 (e.g. by an optical lever method), obtained when the recording medium 53 is scanned in the X- and Y-directions, and the feedback signal applied to piezoelectric actuator 513 are recorded with the scan signal and the surface undulations (the AFM image) are displayed on display unit 510 by means of computer 59 on the basis of the recorded signals.

The signals are fed back to servo control means 511, in which a drive voltage is applied to piezoelectric actuator 58 that is adapted to be driven three-dimensionally to maintain the displacement of the probe 54 selected by the servo control means for feedback operations.

An operation of recording/reproducing information actually proceeds in a manner as will be described below.

Firstly, the probe 54 is made to scan the xy-plane of the recording medium 53. Then, a pulse-application signal is output to an appropriate position on the recording medium 53 from the computer 59 by way of voltage-application power source 512 to record a piece of information on the recording medium 53.

For reproducing the recorded information, a bias DC voltage is applied between the probe 54 and the electroconductive substrate 52 from the voltage application power source 512 to scan the region where the recording operation was conducted and detect the change in the optical performance of the local area (recorded bit) used for recording the information by the above described recording operation by means of optical detection means 58 by way of the inside of the probe 54.

Then, the distribution of the optical characteristics on the xy-plane is rearranged by means of the computer 59 with the positional correspondence of the signals and the probe 54 and is displayed on the display unit 510 simultaneously with the AFM image.

Now, the present invention will be described by way of specific examples, although the present invention is not limited thereto in any sense of the words.

EXAMPLE 1

In this example, a recording medium as shown in FIG. 2 was prepared in a manner as described below.

A 0.5 mm thick non-doped type silicon wafer was used for the substrate 10, on which a 300 angstroms thick Au layer was formed by pattern evaporation to produce an electrode 11 and a drawn-out section 12.

Then, the substrate 10 was cleansed by means of a UV-$O_3$ cleansing technique (at 60° C. for 30 minutes) and fitted to the substrate moving mechanism of an LB film producing apparatus with the electrode surface directed perpendicular relative to the level of water located right below. Subsequently, the substrate 10 was immediately immersed into pure water.

Thereafter, octadecylamine (0.3 mg/ml) was dissolved into chloroform and spread on the water surface. The spread layer was then compressed to show a surface pressure of 20 mN/m. Subsequently it was left there quietly for 5 minutes, maintaining the surface pressure to that level.

Then, the substrate drive mechanism was operated to lift the substrate fitted thereto at a rate of 10 mm/min.

As a result, the octadecylamine layer was transferred onto the substrate with the hydrophobic groups facing outside to make the outermost surface of the substrate hydrophobic.

Thereafter, a total of ten layers of a solvent-soluble precursor of poly(p-phenylene-vinylene) were sequentially fabricated on the substrate 10 by using a process prescribed in M. Era et al., Chem. Lett., 1097 (1988).

Subsequently, the substrate 10 was heated at 200° C. for 2 hours under reduced pressure to produce a poly(p-phenylene-vinylene) thin film as a final product.

Figure 6:
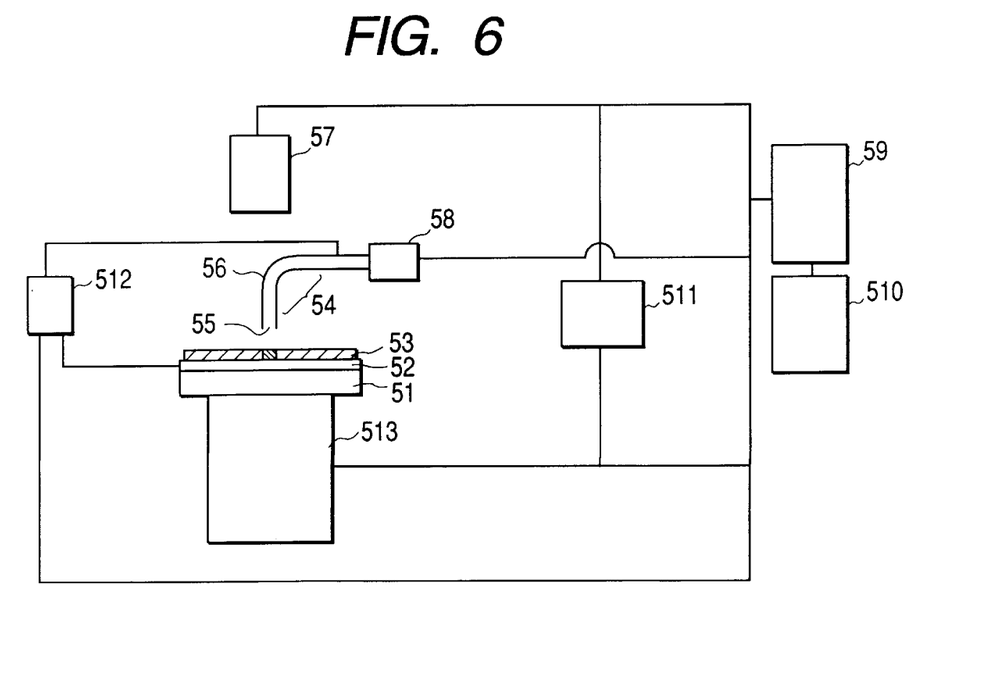
FIG. 6 is a schematic block diagram of a recording/reproducing apparatus according to the invention.

Thereafter, the substrate that carried thereon the thin film prepared in this example as recording medium 53 was fitted to an apparatus according to the invention (FIG. 6). Then, the probe 54 that was provided with an electroconductive coat 56 of a 200 angstroms thick Al layer formed by evaporation was brought close to the recording medium 53 and made to scan the surface of the latter within an area of 10pm square to find undulations less than 1 nm within the scanned area.

Figure 7:
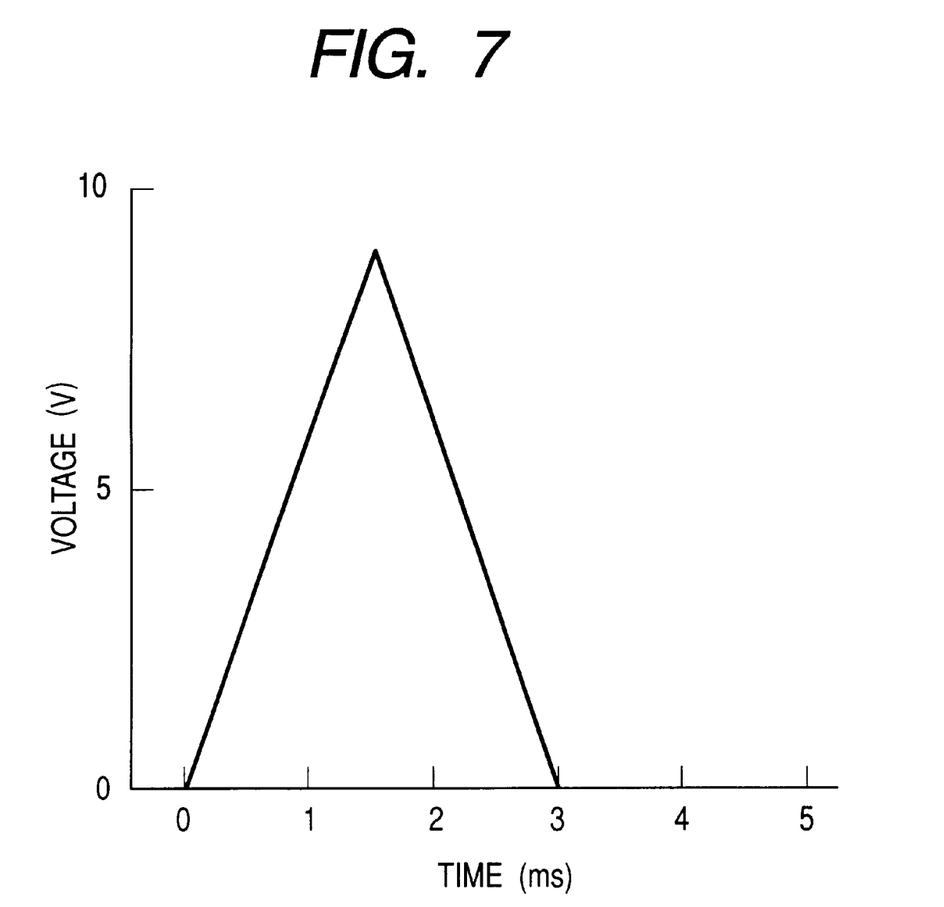
FIG. 7 is a graph schematically illustrating the waveform of a pulse voltage to be applied to a recording medium in order to record information on it.

Then, a voltage pulse as shown in FIG. 7 was applied in such a way that the recording medium 53 was on the positive side, keeping the probe 54 to scan. After returning the probe 54 to the original point of scanning, it was made to scan the surface of the recording medium 53 once again, applying a DC voltage of 6V between the recording medium and the probe such that the recording medium was on the positive side.

Evanescent light was detected by means of the optical detection means 58, which was a photodiode, around the microaperture 55 at the front end of the probe 54 and checked for correspondence to the positional data of the probe 54 by means of the computer 59 to find out that the light was extinguished within an area with a diameter of about 10 nm that corresponded to the area to which the voltage pulse of FIG. 7 had been applied in the scanning cycle. The extinguishment refers to the fact that the light emitting property of the recording medium was destroyed in that area when the voltage pulse was applied thereto. In other words, this means that the area "recorded" by the voltage pulse of FIG. 7 was "reproduced". A similar effect was observed on the recording medium 53 that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 2

In this example, an organic compound different from that of Example 1 was used for preparing a recording medium. More specifically, after preparing a substrate as in Example 1, a total of ten layers of polythiophene LB film were sequentially fabricated on the substrate by using a process prescribed in I. Watanabe et al., ICSM 1988, Santa Fe to produce a recording medium. Then, the recording medium was fitted to the same apparatus as in Example 1 and an information recording/reproducing operation was conducted by means of a probe as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 3

In this example, a substrate was prepared in a manner as described below. A 0.5 mm thick non-doped type silicon wafer was used for the substrate 10, on which a 300 angstroms thick Pt layer was formed to show an intended pattern by sputtering and produce an electrode 11 and a drawn-out section 12. Then, the outermost surface of the substrate 10 was made hydrophobic as in Example 1.

Thereafter, a total of ten layers of a solvent-soluble precursor of poly(p-phenylene-vinylene) were sequentially fabricated on the substrate 10 by using the same process as in Example 1 and heat treated to produce a poly(p-phenylene-vinylene) thin film as the final product.

Then, the recording medium was fitted to the same apparatus as in Example 1 and an information recording/reproducing operation was conducted by means of a probe as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 4

In this example, a poly(p-phenylene-vinylene) thin film was produced by means of the same process as in Example 1 on a substrate that had been prepared as in Example 1.

Then, the substrate carrying thereon the thin film of this example as recording medium was fitted to the same apparatus as in Example 1. Thereafter, a probe, provided with an electroconductive coat of a 200 angstroms thick Ag—Mg layer formed by evaporation, was brought close to the recording medium and made to scan the surface of the latter within an area of 10 μm square to find undulations less than 0.5 nm within the scanned area.

Subsequently, an information recording/reproducing operation was conducted by means of the probe as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 5

In this example, a substrate was prepared as in Example 1.

Then, a methanol-soluble derivative of polyphenylenevinylene was applied to the substrate to a thickness of 70 angstroms by spin coating, using a process as prescribed in Y-E Kim et al., Appl. Phys. Lett., 69, 599 (1996). Subsequently, the substrate was heated to 100° C. for 1 hour to completely remove methanol.

Then, the substrate carrying thereon the thin film of this example as recording medium was fitted to the same apparatus as in Example 1 and evaluated as in Example 1. The probe that was provided with an electroconductive coat of a 200 angstroms thick Al layer formed by evaporation was used to observe the surface of the recording medium to find undulations less than 3 nm within the scanned area so that the thin film of the recording medium was found to be inferior in the surface evenness to the LB films of Examples 1 through 4.

Subsequently, an information recording/reproducing operation was conducted by means of the probe as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 6

In this example, a substrate was prepared as in Example 1.

Then, a mixture of poly(isobutyl methacrylate) and N,N'-biphenyl-N,N'-(3-methylphenyl)-1,1'-biphenyl-4,4'-diamine (TPD) was dissolved into chloroform with a molar ratio of 1:1 and a total of twenty layers of the mixture were sequentially fabricated on the substrate by using the same LB film producing apparatus as in Example 1.

Thereafter, a total of ten layers of a solvent-soluble precursor of poly(p-phenylene-vinylene) were sequentially fabricated on the substrate by using the same process as in Example 1 and heat treated to produce a poly(p-phenylene-vinylene) thin film as final product. FIG. 3 schematically shows the substrate and the recording medium of this example.

Then, the recording medium was fitted to the same apparatus as in Example 1 and an information recording/reproducing operation was conducted by means of a probe as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 7

In this example, a substrate was prepared as in Example 1.

Thereafter, a total of ten layers of a solvent-soluble precursor of poly(p-phenylene-vinylene) were sequentially fabricated on the substrate by using the process of Example 1 and heat treated to produce a poly(p-phenylene-vinylene) thin film as final product.

Subsequently, a mixture of poly(isobutyl methacrylate) and 2-(4-biphenylyl)-5-(4-t-butylphenyl)-1,3,4-oxadiazole (PBD) was dissolved into chloroform with a molar ratio of 1:1 and a total of twenty layers of the mixture were sequentially fabricated on the substrate by using the same LB film producing apparatus as in Example 1. FIG. 4 schematically shows the substrate and the recording medium of this example.

Then, the recording medium was fitted to the same apparatus as in Example 1 and an information recording/reproducing operation was conducted by means of a probe as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 8

In this example, a substrate was prepared as in Example 1.

Then, a total of twenty layers of TPD as described above were sequentially fabricated on the substrate as in Example 6.

Thereafter, a total of ten layers of a solvent-soluble precursor of poly(p-phenylene-vinylene) were sequentially fabricated on the substrate by using the same process as in Example 1 and heat treated to produce a poly(p-phenylene-vinylene) thin film as the final product.

Subsequently, layers of PBD as described above were sequentially fabricated on the substrate as in Example 7. FIG. 5 schematically shows the substrate and the recording medium of this example.

Then, the recording medium was fitted to the same apparatus as in Example 1 and an information recording/ reproducing operation was conducted by means of a probe as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

EXAMPLE 9

In this example, a substrate was prepared as in Example 1.

Thereafter, a total of ten layers of a solvent-soluble precursor of poly(p-phenylene-vinylene) were sequentially fabricated on the substrate by using the same process as in Example 1 and heat treated to produce a poly(p-phenylene-vinylene) thin film as final product. FIG. 3 schematically shows the substrate and the recording medium of this example.

Then, the recording medium was fitted to the apparatus of Example 1 and an information recording/reproducing operation was conducted by means of a probe as in Example 1 except that a 5V DC pulse voltage was applied from the probe such that the recording medium was on the negative side. Subsequently, an information reproducing operation was conducted as in Example 1 to find out that the light was extinguished within an area with a diameter of about 10 nm that corresponded to the area to which a voltage pulse had been applied in the scanning cycle. A similar effect was observed on the recording medium that had been scanned regardless of the location on the recording medium.

The recording medium on which information had been recorded with the above method was stored at room temperature under atmospheric pressure and the information was reproduced some time after the first reproduction to find out that the information could be reproduced without any problem.

As described above in detail, according to the invention using a recording medium that emits light when a voltage is applied thereto, there is provided a method and an apparatus for recording/reproducing information that is free from the problem of lost information due to a discolored pigment. An apparatus according to the invention is reproducible with an enhanced level of accuracy. According to the invention, the recording bit can be dimensionally reduced to as small as about 10nm to achieve a recording density per unit area that is about 100 times greater than any currently available recording density level.

Additionally, since a recording medium that emits light when a voltage is applied thereto is used for the purpose of the invention, no optical excitation system is required to make the recording medium emit light. Still additionally, since the recording medium is realized to form a multilayer structure on a substrate, the substrate is not required to be transparent or semitransparent so that the apparatus can be designed to show a simplified configuration.

What is claimed is:

1. A method for recording/reproducing information comprising the steps of:

arranging a probe and a recording medium having a recording layer of an organic compound on an electrode, said layer being capable of emitting light as a voltage is applied thereto, close by relative to each other and causing them to scan each other, said probe having a microaperture for detecting light and an electroconductive section for applying a voltage to said medium;

applying a voltage between the probe and the recording layer to a level adapted to produce changes in the light emitting performance of the recording layer to thereby record information;

optically detecting the changes in the light emitting performance through the microaperture; and reproducing the information based on the detected changes.

2. A method according to claim 1, wherein said organic compound is comprised of a polymer.

3. A method according to claim 1, wherein said electrode and the electroconductive section of said probe have different work functions.

4. A method according to claim 1, wherein an electron transport layer or a hole transport layer is arranged between said electrode and said recording layer.

5. A method according to claim 1, wherein an electron transport layer or a hole transport layer is arranged on said recording layer.

6. A method according to claim 4, wherein an electron transport layer or a hole transport layer is arranged on said recording layer.

7. An apparatus for recording/reproducing information comprising:

a scanning mechanism for arranging a probe and a recording medium having a recording layer of an organic compound on an electrode, said layer being capable of emitting light as a voltage is applied thereto, close by relative to each other and causing them to scan each other, said probe having a microaperture for detecting light and an electroconductive section for applying a voltage to said medium;

voltage application means for applying a voltage between the probe and the recording layer to a level adapted to produce changes in the light emitting performance of the recording layer to thereby record information;

optical detection means for optically detecting the changes in the light emitting performance through the microaperture; and reproduction means for reproducing the information based on the detected changes.

8. An apparatus according to claim 7, wherein said organic compound is comprised of a polymer.

9. An apparatus according to claim 8, wherein said electrode and the electroconductive section of said probe have different work functions.

10. An apparatus according to claim 8, wherein an electron transport layer or a hole transport layer is arranged between said electrode and said recording layer.

11. An apparatus according to claim 8, wherein an electron transport layer or a hole transport layer is arranged on said recording layer.

12. An apparatus according to claim 10, wherein an electron transport layer or a hole transport layer is arranged on said recording layer.

6,147,959

13

\* \* \* \* \*

14

UNITED STATES PATENT AND TRADEMARK OFFICE
CERTIFICATE OF CORRECTION

PATENT NO. : 6,147,959
DATED : November 14, 2000
INVENTOR(S) : Junji Ohyama

It is certified that error appears in the above-identified patent and that said Letters Patent is hereby corrected as shown below:

Title page, Item [54], Column 1, lines 1-4,
"METHOD AND APPARATUS FOR RECORDING/REPRODUCING INFORMATION UTILIZING NEAR FIELD LIGHT," should read
-- METHOD AND APPARATUS FOR RECORDING AND/OR REPRODUCING INFORMATION USING A RECORDING MEDIUM HAVING A LIGHT-EMITTING RECORDING LAYER --.

Column 1,
Line 22, "store" should read -- store a --.
Line 28, "above identified" should read -- above-identified --.
Line 51, "an" should read -- a --.

Column 2,
Line 30, "above identified" should read -- above-identified --.

Column 3,
Line 16, "cross sectional" should read -- cross-sectional --.
Line 46, "suicides," should read -- silicides, --.

Column 4,
Line 4, "amphilphilic" should read -- amphiphilic --.
Line 41, "according-, to" should read -- according to --.

Column 6,
Line 14, "above described" should read -- above-described --.

Column 7,
Line 44, "10pm" should read -- $10 \mu m$ --.

Column 10,
Lines 5 and 31, "final" should read -- the final --.

Column 11,
Line 27, "final" should read -- the final --.
Line 57, "10nm" should read -- 10 nm --.

UNITED STATES PATENT AND TRADEMARK OFFICE
CERTIFICATE OF CORRECTION

PATENT NO. : 6,147,959
DATED : November 14, 2000
INVENTOR(S) : Junji Ohyama

It is certified that error appears in the above-identified patent and that said Letters Patent is hereby corrected as shown below:

Column 12,
Lines 56, 59 and 62, "claim 8," should read -- claim 7, --.

Signed and Sealed this

Sixteenth Day of April, 2002

Attest:

JAMES E. ROGAN
Director of the United States Patent and Trademark Office

Attesting Officer

UNITED STATES PATENT AND TRADEMARK OFFICE
CERTIFICATE OF CORRECTION

PATENT NO.    : 6,147,959
DATED         : November 14, 2000
INVENTOR(S)   : Junji Ohyama It is certified that error appears in the above-identified patent and that said Letters Patent is hereby corrected as shown below:

<u>Title page, Item [54] and Column 1, line 1,</u>
Title, "METHOD AND APPARATUS FOR RECORDING/REPRODUCING INFORMATION UTILIZING NEAR FIELD LIGHT," should read -- METHOD AND APPARATUS FOR RECORDING AND/OR REPRODUCING INFORMATION USING A RECORDING MEDIUM HAVING A LIGHT-EMITTING RECORDING LAYER --.

<u>Column 1,</u>
Line 22, "store" should read -- store a --.
Line 28, "above identified" should read -- above-identified --.
Line 51, "an" should read -- a --.

<u>Column 2,</u>
Line 30, "above identified" should read -- above-identified --.

<u>Column 3,</u>
Line 16, "cross sectional" should read -- cross-sectional --.
Line 46, "suicides," should read -- silicides, --.

<u>Column 4,</u>
Line 4, "amphilphilic" should read -- amphiphilic --.
Line 41, "according-, to" should read -- according to --.

<u>Column 6,</u>
Line 14, "above described" should read -- above-described --.

<u>Column 7,</u>
Line 44, "10pm" should read -- $10 \mu$m --.

<u>Column 10,</u>
Lines 5 and 31, "final" should read -- the final --.

<u>Column 11,</u>
Line 27, "final" should read -- the final --.
Line 57, "10nm" should read -- 10 nm --.

UNITED STATES PATENT AND TRADEMARK OFFICE
CERTIFICATE OF CORRECTION

PATENT NO. : 6,147,959
DATED : November 14, 2000
INVENTOR(S) : Junji Ohyama It is certified that error appears in the above-identified patent and that said Letters Patent is hereby corrected as shown below:

Column 12,
Lines 56, 59 and 62, "claim 8," should read -- claim 7, --.

Signed and Sealed this

Twenty-seventh Day of December, 2005

JON W. DUDAS
*Director of the United States Patent and Trademark Office*